(12) United States Patent
Coburn et al.

(10) Patent No.: US 10,108,550 B2
(45) Date of Patent: Oct. 23, 2018

(54) MEMORY MANAGEMENT SUPPORTING HUGE PAGES

(71) Applicant: Google LLC, Mountain View, CA (US)

(72) Inventors: Joel Dylan Coburn, Mountain View, CA (US); Albert Borchers, Aptos, CA (US); Christopher Lyle Johnson, San Francisco, CA (US); Robert S. Sprinkle, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/273,433

(22) Filed: Sep. 22, 2016

(65) Prior Publication Data

US 2018/0081816 A1  Mar. 22, 2018

(51) Int. Cl.
| | |
|---|---|
| *G06F 12/08* | (2016.01) |
| *G06F 12/0868* | (2016.01) |
| *G06F 12/0871* | (2016.01) |
| *G06F 12/0873* | (2016.01) |
| *G06F 12/12* | (2016.01) |

(Continued)

(52) U.S. Cl.
CPC ...... *G06F 12/0868* (2013.01); *G06F 12/0871* (2013.01); *G06F 12/0873* (2013.01); *G06F 12/1009* (2013.01); *G06F 12/1027* (2013.01); *G06F 12/12* (2013.01); *G06F 2212/1016* (2013.01); *G06F 2212/1024* (2013.01); *G06F 2212/152* (2013.01); *G06F 2212/305* (2013.01);

(Continued)

(58) Field of Classification Search
CPC ......... G06F 12/00; G06F 12/12; G06F 12/121
See application file for complete search history.

(56) References Cited

U.S. PATENT DOCUMENTS

| | | | |
|---|---|---|---|
| 5,361,345 A | 11/1994 | English | |
| 6,112,285 A | 8/2000 | Ganapathy et al. | |

(Continued)

FOREIGN PATENT DOCUMENTS

| | | |
|---|---|---|
| CN | 105095099 | 12/2017 |
| EP | 3282364 | 2/2018 |

(Continued)

OTHER PUBLICATIONS

International Search Report and Written Opinion issued in International Application No. PCT/US2017/048663, dated Oct. 30, 2017, 14 pages.

(Continued)

*Primary Examiner* — Tuan Thai
(74) *Attorney, Agent, or Firm* — Fish & Richardson P.C.

(57) ABSTRACT

Methods, systems, and apparatus for receiving a request to access, from a main memory, data contained in a first portion of a first page of data, the first page of data having a first page size; initiating a page fault based on determining that the first page of data is not stored in the main memory; allocating a portion of the main memory equivalent to the first page size; transferring the first portion of the first page of data from the secondary memory to the allocated portion of the main memory without transferring the entire first page of data; and updating a first page table entry associated with the first portion of the first page of data to point to a location of the allocated portion of the main memory to which the first portion of the first page of data is transferred.

15 Claims, 4 Drawing Sheets

(51) Int. Cl.
*G06F 12/1009* (2016.01)
*G06F 12/1027* (2016.01)
(52) U.S. Cl.
CPC ............... *G06F 2212/3042* (2013.01); *G06F 2212/604* (2013.01); *G06F 2212/652* (2013.01)

(56) References Cited

U.S. PATENT DOCUMENTS

| | | | |
|---|---|---|---|
| 6,804,729 | B2 | 10/2004 | Swanberg |
| 7,447,869 | B2 * | 11/2008 | Kruger ................ G06F 12/1009 711/205 |
| 7,519,781 | B1 | 4/2009 | Wilt |
| 8,533,382 | B2 * | 9/2013 | Scales ................ G06F 11/1438 711/206 |
| 2009/0172344 | A1 * | 7/2009 | Grochowski ....... G06F 12/1027 711/207 |
| 2011/0004739 | A1 | 1/2011 | Hombmuth et al. |
| 2011/0087857 | A1 | 4/2011 | Bomma et al. |
| 2014/0013073 | A1 | 1/2014 | Gheith et al. |
| 2014/0281299 | A1 | 9/2014 | Duluk et al. |
| 2015/0058522 | A1 | 2/2015 | Armstrong et al. |
| 2015/0127767 | A1 | 5/2015 | Gheith et al. |
| 2015/0199126 | A1 | 7/2015 | Jayasena et al. |
| 2015/0363326 | A1 | 12/2015 | Baskakov et al. |
| 2018/0046378 | A1 | 2/2018 | Coburn et al. |
| 2018/0046411 | A1 | 2/2018 | Coburn et al. |

FOREIGN PATENT DOCUMENTS

| | | | |
|---|---|---|---|
| WO | WO 2011/002900 | 1/2011 | |
| WO | WO 2011002900 A1 * | 1/2011 | ......... G06F 12/1009 |

OTHER PUBLICATIONS

Badam et al., "Better flash access via shape-shifting virtual memory pages," Proceedings of the First ACM SIGOPS Conference on Timely Results in Operating Systems. ACM, 2013, 14 pages.
Gorman, Mel, "Understanding the Linux virtual memory manager," Upper Saddle River: Prentice Hall, Jul. 2004, 731 pages.
Irish Search Report and Written Opinion issued in Irish Application No. 2017/0188, dated Feb. 22, 2018, 5 pages.
Written Opinion issued in International Application No. PCT/US2017/048663, dated May 28, 2018, 7 pages.
Search Report and Written Opinion issued in Singaporan Application No. 10201707699V, dated Apr. 11, 2018, 9 pages.

* cited by examiner

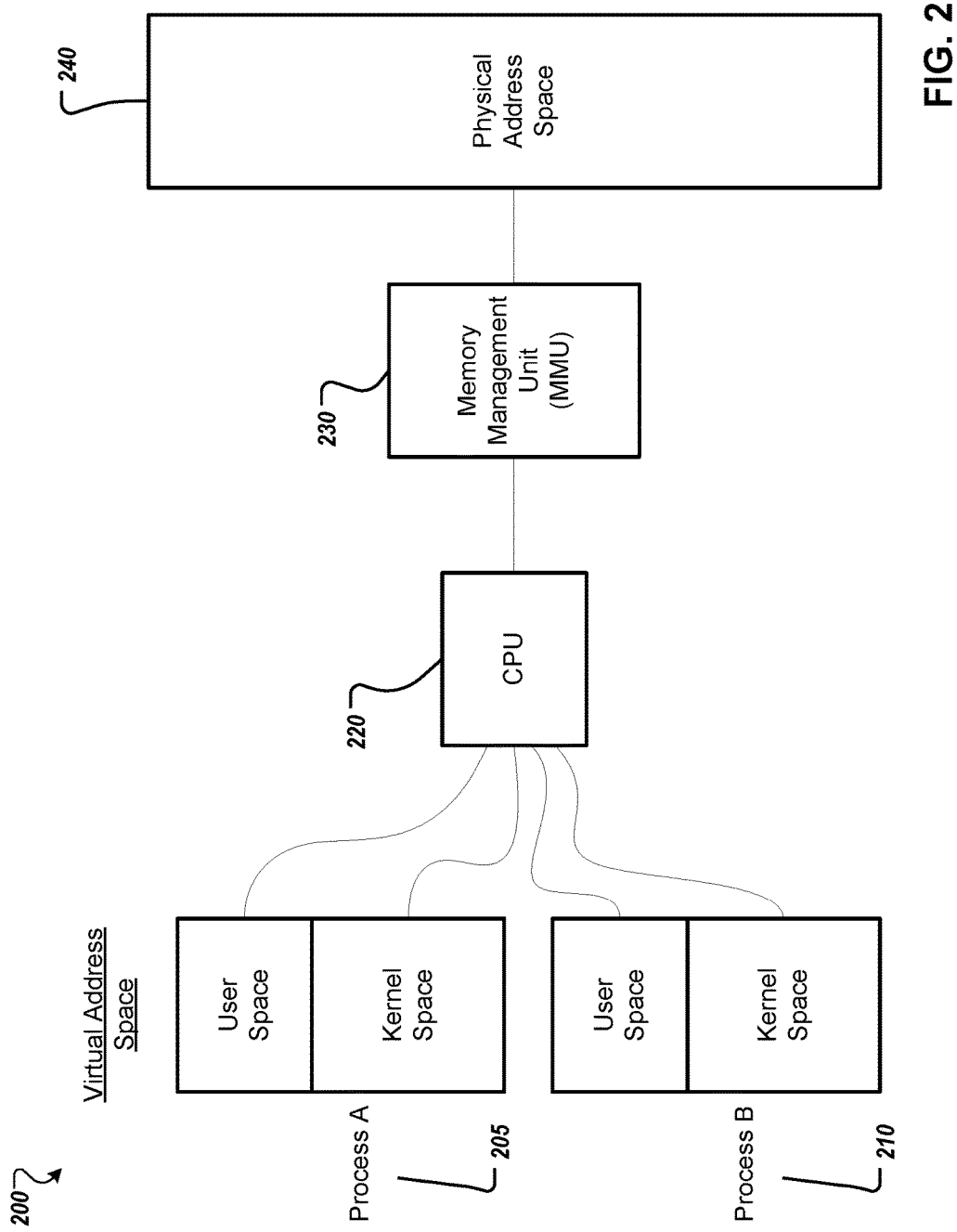

MEMORY MANAGEMENT SUPPORTING HUGE PAGES

FIELD

The present specification generally relates to memory systems.

BACKGROUND

A wide variety of memory devices can be used to maintain and store data and instructions for various computers and similar systems. In conventional computing systems, Dynamic Random Access Memory (DRAM) technology has typically been employed to operate the dynamic memory of the computer in order for an application to operate at high speeds. However, DRAM used as main memory in computer systems is no longer scaling as rapidly as in the past. As a result, DRAM storage has become a limited resource in computing environments.

SUMMARY

A second tier of memory may be used, such as disk-based memory, NAND flash memory, spin torque transfer magnetic memory (STT-MRAM), resistive random access memory (ReRAM), or the like. The second tier of memory may be accessed locally over a memory or IO bus, or remotely over a high-speed network. However, applications need to explicitly manage data placement or the system must provide automatic management that transparently moves data between memory tiers. In addition, huge pages or large pages or super pages, those terms used interchangeably, have been shown to provide a significant performance increase for most workloads and particularly for cloud-based serving applications, where huge pages are blocks of memory that are larger in size, e.g., 8 KB, 64 KB, 256 KB, 1 MB, 2 MB, 4 MB, 16 MB, 256 MB, 512 MB, or 1 GB, than a typical page, which may be 4 KB, depending on processor architecture. Thus, new techniques are needed for automatic management with minimal performance impact to overcome the inadequacies of existing techniques.

One innovative aspect of the subject matter described in this specification is embodied in systems and methods that include receiving a request to access, from a main memory, data contained in a first portion of a first page of data, the first page of data having a first page size and the first portion comprising a second page size that is less than the first page size; initiating a page fault based on determining that the first page of data is not stored in the main memory and is stored in a secondary memory; in response to initiating the page fault, allocating a portion of the main memory equivalent to the first page size; transferring the first portion of the first page of data from the secondary memory to the allocated portion of the main memory without transferring the entire first page of data, wherein a remaining amount of the first page of data remains stored in the secondary memory; and updating a first page table entry associated with the first portion of the first page of data to point to a location of the allocated portion of the main memory to which the first portion of the first page of data is transferred.

In certain implementations, the remaining amount of the first page of data is transferred from the secondary memory to the main memory. Transferring the remaining amount of the first page of data may include repeatedly transferring respective portions, corresponding to the second page size, of the first page of data from the secondary memory to the allocated portion of the main memory until the entire first page of data is stored in the main memory; and updating a respective page table entry for each of the respective portions of the first page of data to point to respective locations of the respective portions of the first page of data in the main memory.

In certain implementations, once the entire first page of data is stored in the main memory, the first page of data is reassembled from the respective portions of the first page of data transferred from the secondary memory to the allocated portion of the main memory; and a page table entry associated with the first page of data is updated to point to a location of the reassembled first page of data in the main memory.

Another aspect of the subject matter described in this specification is embodied in systems and methods that include, before transferring the remaining portion of the first page of data from the secondary memory to the main memory, indicating that the first portion of the first page of data that was requested to be accessed has been transferred to the main memory.

Another innovative aspect of the subject matter described in this specification is embodied in systems and methods that include determining whether an access bit is set for each page table entry of a page table based on a scan of the page table with a page table scanner, the access bit indicating whether a page associated with the page table entry was accessed in a last scan period, wherein at least one of the pages having the first page size is divided into pages of the second page size with a page table entry for each of the pages of the second page size in the page table being scanned; incrementing a count for each page in response to determining that the access bit is not set for the page table entry associated with the page; and after determining whether the access bit is set for each page table entry, resetting the access bit.

In certain implementations, if the portion of the main memory equivalent to the first page size cannot be allocated, one of a least used pages having the first page size is determined based on the count for each page and releasing the one of the least used pages into the secondary memory, and a portion of the main memory equivalent to the first page size is allocated at the location of the released one of the least used pages; and if the portion of the main memory equivalent to the first page size can be allocated, the first portion of the first page of data is transferred from the secondary memory to the allocated portion of the main memory.

Other embodiments of these aspects include corresponding systems, apparatus, and computer programs, configured to perform the actions of the methods, encoded on computer storage devices.

Particular embodiments of the subject matter described in this specification can be implemented so as to realize one or more of the following advantages. For example, the usage or access statistics for pages in memory may be more precise and accurate than current methods involving software and sampling techniques because access statistics may be determined at the sub-page level rather than just at the page level. Further, by transferring a particular portion of a page for which access is requested first, rather than the full page of data, the delay caused by transferring a page in response to a request to access the page may be reduced, which may result in faster execution of the application or process being executed. Another advantage is that the system can take advantage of the benefits of huge pages, such as better memory access performance due to fewer levels of page tables and better translation lookaside buffer (TLB) coverage, and still perform paging at a small page granularity, which provides better page fault performance due to the reduced latency of servicing a page fault that only needs to transfer a small page. Therefore, both the memory access benefits of huge pages and the demand paging benefits of small pages can both be achieved. Moreover, only the data that is needed may be transferred according to the small page size, and as a result, the main memory is not occupied with unnecessary data, due to better maintaining hot data in main memory and cold data in secondary memory as compared to paging huge pages directly.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 depicts an example of a system including a memory device according to implementations of the present disclosure.

Like reference numbers and designations in the various drawings indicate like elements.

DETAILED DESCRIPTION

Huge pages have been shown to provide a significant performance increase for most workloads and particularly for cloud-based serving applications. While the term "huge pages" may be used herein, the term applies to any size of page that is larger than the smallest sized page, i.e., small page, a particular architecture can handle or its standard page size. For example, a smallest page size or standard page size for a particular architecture may be 4 KB and a huge page may be 2 MB. In other implementations, for example, a huge page may be 8 KB, 64 KB, 256 KB, 1 MB, 2 MB, 4 MB, 16 MB, 256 MB, 512 MB, or 1 GB, or larger, or any size in between. For example, a huge page may be any integer multiple, n, of 4 KB, i.e., n*4 KB, and in certain embodiments may be any power of two multiple of the standard page size. Embodiments of the present disclosure introduce a new scheme that can use huge pages for accessing a DRAM cache while using traditional small pages to page to a second tier of slower memory. Certain embodiments may be modified based on the type of interconnect used to access slower memory. For example, a software-based solution based on a customized kernel driver may be implemented for an IO interconnect. Further, for example, a hardware solution for managing huge pages may be implemented for a cache coherent interconnect.

Accordingly, embodiments of the present disclosure provide a system for high-performance automatic management of a secondary memory available either locally over a memory or IO bus, or remotely over a network. The secondary memory may be disk-based and may be computer memory that is non-volatile and persistent in nature. The secondary memory may not be directly accessed by the processor and may be slower than the primary or main memory. The main memory, also referred to as primary memory, primary storage, internal memory or first-tier memory, may be directly accessible to the CPU. As described in more detail below, an optimized kernel driver, for example, may provide a fast path to the second tier of memory and handle all communication with the memory management hardware. That process is advantageous compared to existing paths through the kernel for paging, which incur large costs for things like synchronization, memory management, and block 10 transfers.

These features and additional features are described in more detail below.

Figure 1:
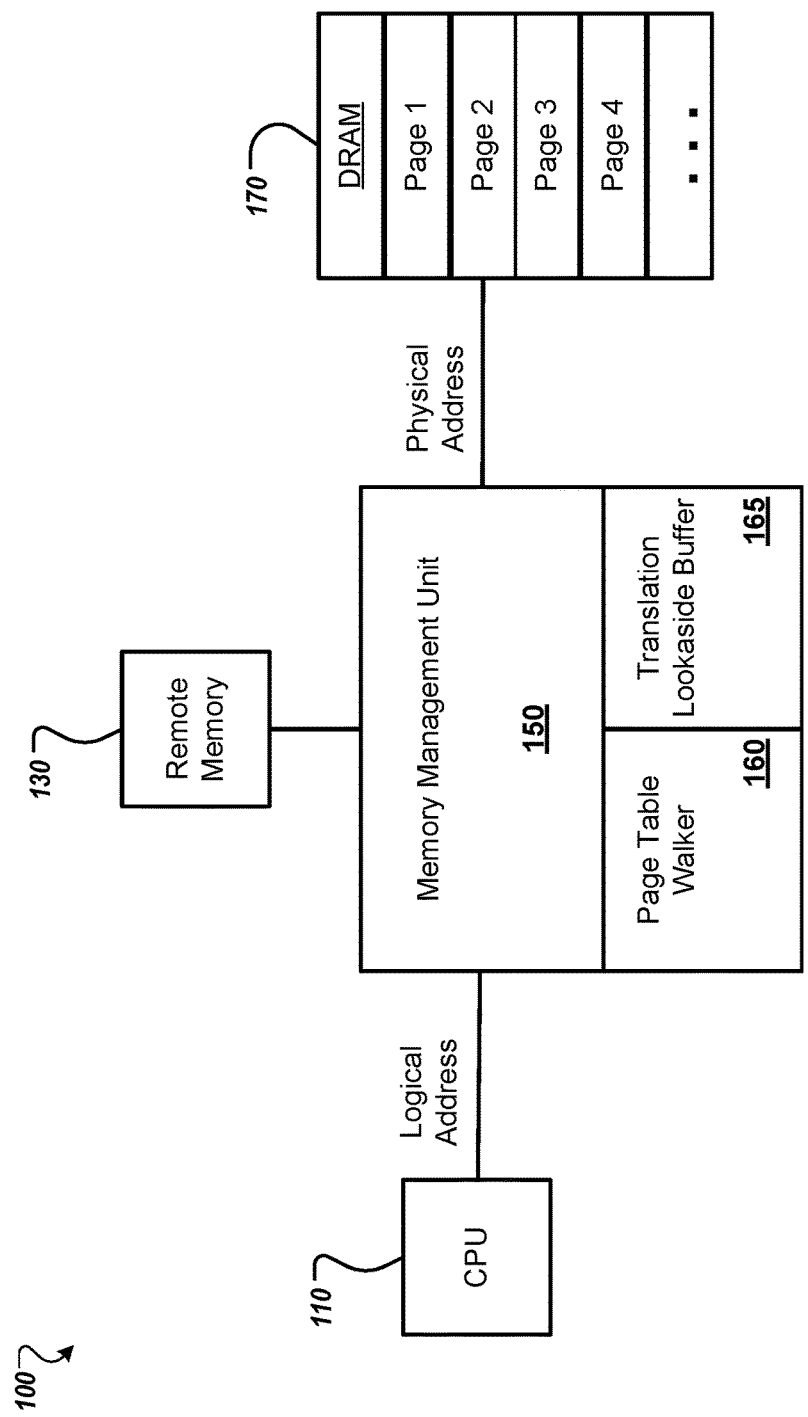
FIG. 1 depicts an example of a system including a memory device according to implementations of the present disclosure.

FIG. 1 depicts an example of a system 100 including a memory device according to implementations of the present disclosure. A central processing unit (CPU) 110 may be in communication with a DRAM 120 and a memory management unit (MMU) 150. The system 100 may further include remote memory 130, which may be accessed over a network. The MMU 150 may operate in the management of memory. In addition, a page table walker 160 and a translation lookaside buffer (TLB) 165 may be part of, or implemented with, MMU 150. The system 100 may additionally include DRAM 170 as physical memory.

The MMU 150 is a hardware unit that may have memory references passed through it, performing the translation of virtual memory addresses to physical addresses and handling cache control. For example, the MMU 150 may use a page table as an in-memory table containing one page table entry (PTE) per page, to map virtual page numbers to physical page numbers in main memory. The translation lookaside buffer 165, as an associative cache of PTEs, may be used to avoid the necessity of accessing the main memory every time a virtual address is mapped. When a PTE prohibits access to a virtual page, for example because no physical random access memory has been allocated to that virtual page, the MMU 150 may signal a page fault to the CPU 110.

The CPU 110 may have a cache, which may be a small amount of fast memory built into a processor that may be configured to contain temporary copies of data to reduce processing latency. The TLB 165 may be a fixed-size array of recently used pages, which the CPU 110 may check at each memory access. The TLB 165 may list virtual address ranges to which physical pages in DRAM 170 are currently assigned. Thus, for example, the TLB 165 may serve as a cache for the MMU 150. In this manner, accesses to virtual addresses listed in the TLB 165 may go directly to the associated physical memory, e.g., DRAM 170. In addition, accesses to virtual addresses not listed in the TLB 165, i.e., a TLB miss, may trigger a page table lookup, which may be performed by hardware, or by a page fault handler.

FIG. 2 depicts an example of a system 200 including a memory device according to implementations of the present disclosure. The system 200 may include a CPU 220 and a Physical Address Space 240. The MMU 230 may interpret virtual addresses to identify corresponding physical addresses. For example, attempts to read, write, or execute memory at virtual addresses may be either translated to corresponding physical addresses, or an interrupt, i.e., a page fault, may be generated to allow software to respond to the attempted access. The physical memory addresses may identify a specific memory cell or portion within a piece of the storage hardware making up the physical memory associated with a given read or write operation. The virtual memory may provide a software-controlled set of memory addresses, e.g., Virtual Address Space, and may allow each process, e.g., Process A 205 and Process B 210 to have its own virtual memory address range, which may include kernel space and user space. The virtual addresses may be interpreted by the MMU 230 using page tables, which may map virtual address ranges to associated stored content. Although the smallest addressable unit to a processor may be a byte or a word, the MMU 230 may manage memory in pages.

Figure 3B:
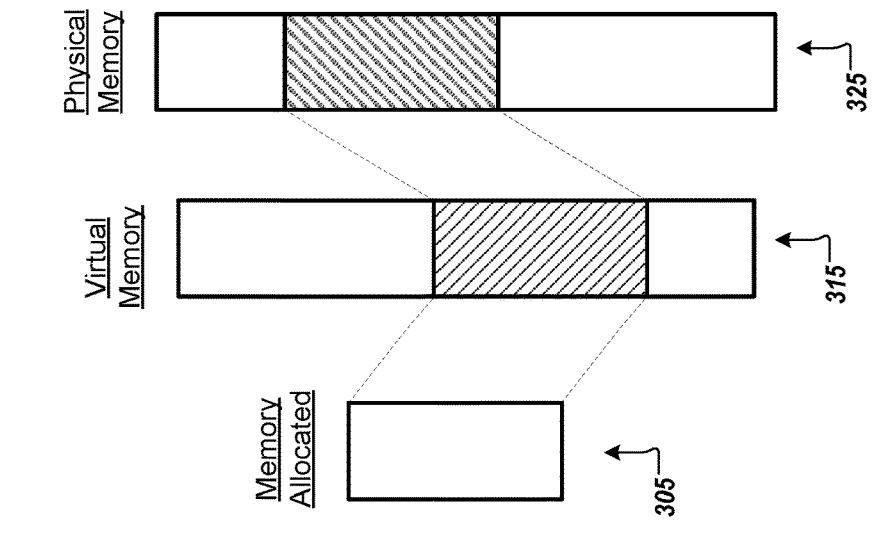
FIG. 3B depicts an example of a portion of memory allocated according to implementations of the present disclosure.
Figure 3A:
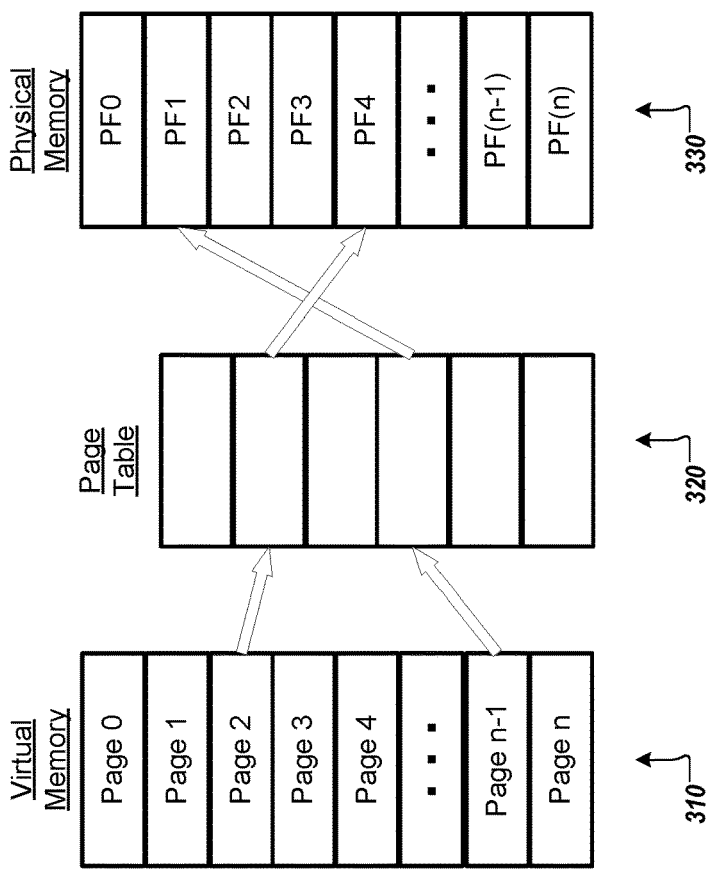
FIG. 3A depicts an example of a page table for mapping virtual memory to physical memory according to implementations of the present disclosure.

FIG. 3A depicts an example of a page table 320 for mapping virtual memory 310 to physical memory 330 according to implementations of the present disclosure. The page tables 320 may be data structures that contain a list of memory mappings for a process and may be used to track associated resources. For example, each process may have its own set of page tables. The virtual address space, e.g., virtual memory 310, may be divided into pages, which may be a contiguous span of addresses of a particular size. The pages may be structured such that the starting address of a page is a multiple of the page size. As described above, the MMU 230 may use the page table 320 to interpret virtual addresses of pages from virtual memory 310 and identify corresponding physical addresses of page frames in physical memory 330. In addition, page tables may be hierarchical or multi-level, hash-based, or the like, which provides an advantage for huge pages, higher up the hierarchy with a faster page table walk.

As referenced above, a secondary memory or second tier of memory, such as disk-based memory or other second tier memory, may be slower than main memory or primary memory, such as DRAM. According to certain implementations, a customized kernel driver may manage the second tier of memory with huge pages. The kernel driver may reserve physical memory in contiguous regions that are multiples of huge pages for the cache in DRAM. When an application needs additional memory, the kernel driver may allocate space in huge page multiples, i.e., in multiples of the size of a huge page. The kernel driver may implement a page replacement policy, and when data for replacement is selected, a huge page may be paged out to the second tier of memory. That process may occur asynchronously to the running application that requested access to data in memory.

When the application faults on an access to data that resides in the second tier of memory, a page fault handler may transfer only a single small page containing the requested cache line from the second tier of memory to main memory, e.g. DRAM. However, according to certain implementations, the state of each small page that makes up the huge page may be tracked. Thus, for example, when the kernel driver faults in all or a predetermined amount of the small pages within the huge page, a determination may be made to page-in any remaining small pages and coalesce or reassemble the small pages back into a huge page in DRAM by replacing the existing PTEs with a single PTE for the huge page and flushing any relevant TLB entries from the TLB 165.

Accordingly, the benefits of huge pages for data that resides in DRAM may be maintained while the cost of page faults may also be reduced by completing the fault handler process after transferring the small page. For example, using huge pages may provide the advantage of reducing resource overhead because tracking data at a larger granularity enables a smaller page table having fewer entries. Using huge pages, however, may cause the overall write bandwidth to increase if the system always writes out huge pages to the second tier of memory. Also, there is a possibility that small pages within a huge page that are "hot," e.g., frequently used or recently used, may get paged out to the secondary, slower memory, resulting in additional faults on that "hot" data. According to certain implementations, those issues may be mitigated by the kernel driver dynamically determining when to break up or coalesce huge pages based on huge page and small page statistics. For example, huge pages may be periodically broken up to gather statistics, through PTE access bits, about the small pages within a huge page, as described in more detail below. Further, the driver may maintain both huge pages and small pages, such that when a predetermined number of small pages within a huge page are "hot" or frequently or recently accessed, the small pages may be migrated to a huge page and merged. Conversely, if too many sub-pages, i.e., small pages, within a huge page are "cold", the huge page may be broken up and processed as small pages.

According to certain implementations, when an attempt is made to access data that is not stored in main memory and a page fault occurs, the entire huge page may not be transferred into main memory, but rather a smaller chunk of data, e.g. a small page, that includes the data for which access is requested may be transferred from secondary memory to main memory. Thus, the application may access the data requested and continue running. Subsequently, the remainder of the huge page may be transferred into main memory in the background, and the page table entry may be updated accordingly. In this way, the requested data may be accessed more quickly and the system may still reap the benefits of managing huge pages. In other words, the time required for reading huge pages from secondary memory and writing huge pages to main memory is greater than the time required for reading and writing small pages; and thus, reading only the small page containing the data that is requested to be accessed reduces the time the application or processing thread is suspended or waiting for the data to be transferred from secondary memory to main memory. Thus, reducing the latency time for transferring data into main memory is more important, as performance critical, than the time for transferring data back to secondary memory because the data transferred out of main memory is typically a page of "cold" data that is transferred in the background with little or no effect on operating performance, whereas the data being transferred into main memory may be delaying the execution of the application or processing thread.

As described above, a page fault may occur when a thread or running program accesses a memory page that is mapped into the virtual address space, but not actually loaded into main memory. The MMU 150 or a page fault handler may detect the page fault, and when the page fault is detected, a determination may be made as to whether there is a free page in memory. If there is a free page, page data may be copied from the secondary storage to the free page location in memory. If there is not a free page, a page may be pulled, for example, from a FIFO queue, which may track all the pages in memory in a queue, with the most recent arrival at the back, and the oldest arrival in front. If that page is dirty, i.e., has been modified, the system may write the page to the secondary memory. In transferring the page from the main memory to the secondary memory, the page table entry associated with the page may be invalidated, and a TLB shootdown for any entries associated with the page may be executed, e.g., causing the TLB entries to be flushed for other processors. With that page now free, page data may be copied from the secondary storage to the free page location.

The page tables may be updated to create a valid PTE by updating the PTE associated with the page to point to the location in the main memory of the page. Once the page fault is handled, the thread or running program may resume with the data it requested to access now in main memory.

FIG. 3B depicts an example of a portion of memory 305 allocated according to implementations of the present disclosure. With demand paging, a page of "cold" data, e.g., data that is accessed at a rate that is less than some threshold access rate or that has not been accessed for a particular period of time, may need to be written out to secondary storage, and a page of data may need to be transferred back to main memory when an application tries to access data and a page fault occurs. According to certain implementations, the process of paging in and out of main memory occurs from the processor's perspective as if the system is only working with huge pages. In other words, a huge page may be transferred out of main memory when cold, i.e., not being used frequently or recently, and when a page needs to be transferred into main memory, a whole huge page of memory may be allocated, even though only a portion of the huge page, e.g., a small page, may be initially transferred. Thus, memory allocated 305 may correspond to a huge page, and contiguous memory corresponding to the huge page may be allocated in physical memory 325 as well as virtual memory 315.

For example, when a page fault occurs and a page of data needs to be transferred into main memory, a huge page of memory may first be allocated. Then, rather than transferring the whole huge page containing the data requested to be accessed, only the sub-page or small page of data that contains the data requested to be accessed by the application may be transferred into main memory initially. For example, an application may only need to access a byte or a word, such that the whole huge page is not required for the application to continue, and the system may only transfer into main memory a smaller portion of data, e.g., a small page, that includes the data the application needs to continue running. Upon the transferring of that small page, an indication may be made to the application that the requested data has been transferred into main memory or is now available to be accessed from main memory.

Subsequently, because the whole huge page was not transferred into main memory, the remaining portion of the huge page may be transferred into main memory in the background. Alternatively, it may be determined that breaking up the huge page into small pages is advantageous, for example based on access statistics, and thereby change paging data structures from a single huge page to constituent small pages. If an application subsequently accesses any of the remaining small pages that had not been transferred into main memory, those small pages may be transferred at that time, i.e., when requested to be accessed, with a page fault occurring.

To make the determination regarding whether to transfer the remaining portion of the huge page and coalesce or to break up the huge page into small pages, access statistics may be gathered to identify the "temperature" of pages, e.g., "hot" pages and "cold" pages among the pages within the huge page. Thus, according to certain implementations, memory is allocated and reserved in huge page chunks, but a huge page may be broken into small pages to work with smaller page chunks. When a huge page is broken into small pages, the page table may be updated with a respective PTE for each small page; and when a huge page is reassembled, the page table may be updated by replacing the respective PTEs for each small page with one entry for the full huge page.

Gathering access statistics for pages may be accomplished through any process or means of determining access of pages, e.g., determining "cold" pages and "hot" pages. For example, a process may include periodically breaking up a huge page into small pages, scanning the set of pages and reading an access bit to determine when a small page was last accessed or the frequency or how recently a small page was accessed, and then reassembling the small pages back into the huge page once access statistics have been gathered. In this manner, for example, a sample of accesses to sub-pages or small pages within the huge page may be used to obtain statistical data about access to the small pages.

In more detail, in certain implementations, page table scanning, i.e., a scan through the page table, may be performed via hardware, rather than software requiring CPU overhead, which often results in slower memory access and processing and discarding some otherwise useful cache information. In general, the frequency of access of page data, e.g., which page data is frequently accessed relative to other pages of data and which page data is infrequently accessed relative to other pages of data may be determined by scanning the page table. Each page mapped in the page table, e.g., each PTE, may have a flag or access bit that may be set whenever the page is accessed, and then cleared by the CPU after scanning the page table.

This hardware may be implemented by augmenting the page table walker 160 or MMU 150, which may include one or more page table walkers, e.g., built-in hardware to read the page table and automatically load virtual-to-physical translations into the TLB 165. Thus, the hardware may be part of the processor architecture, using the page table scanning mechanism in the processor. For example, the hardware may implement a routine to scan through a page table, scanning the PTEs, to determine if an access bit has been set at each PTE since the last scan. The access bit may be cleared after determining that the access bit has been set, and then operations may proceed until the next scan of the page table. The scanning may occur periodically, e.g., with a predetermined time period between scans, or the scanning may be triggered by some external event. Each time it is determined that an access bit or flag is set, a count may be incremented for each page, respectively. Alternatively, each time it is determined that an access bit or flag is not set, a count may be incremented for each page, respectively.

Over time, a profile may be created from the scanning, and the profile may indicate how often and/or how recently each page is accessed. For example, the hardware may include one or more counters for each page or bloom filters to maintain the usage statistics, e.g., the count of set access bit or flag, or the results may be stored in memory, e.g., a two-level memory, to allow sorting and filtering, e.g., most and least used pages or more frequently and less frequently accessed pages. In more detail, the hardware may maintain a per-page counter to determine how recently a page was accessed, and each counter may be updated when the respective PTE is scanned. The per-page counters may be provided in on-chip SRAM for fast access. Alternatively, because the size of the secondary memory may be large, making the area cost of the counters higher, counting bloom filters may be used to maintain the access statistics about sets of pages, thereby saving area. Alternatively, the hardware may use a small amount of private DRAM or may store the counters in system DRAM.

Accordingly, for example, based on the access statistics, the pages may be ordered from most used to least used or vice versa. When the page fault is serviced, if there are no free pages in main memory DRAM 170, a paging process may release or write back one of the least used pages into the secondary memory and may use the location of that least used page to transfer the new page into main memory.

Figure 4:
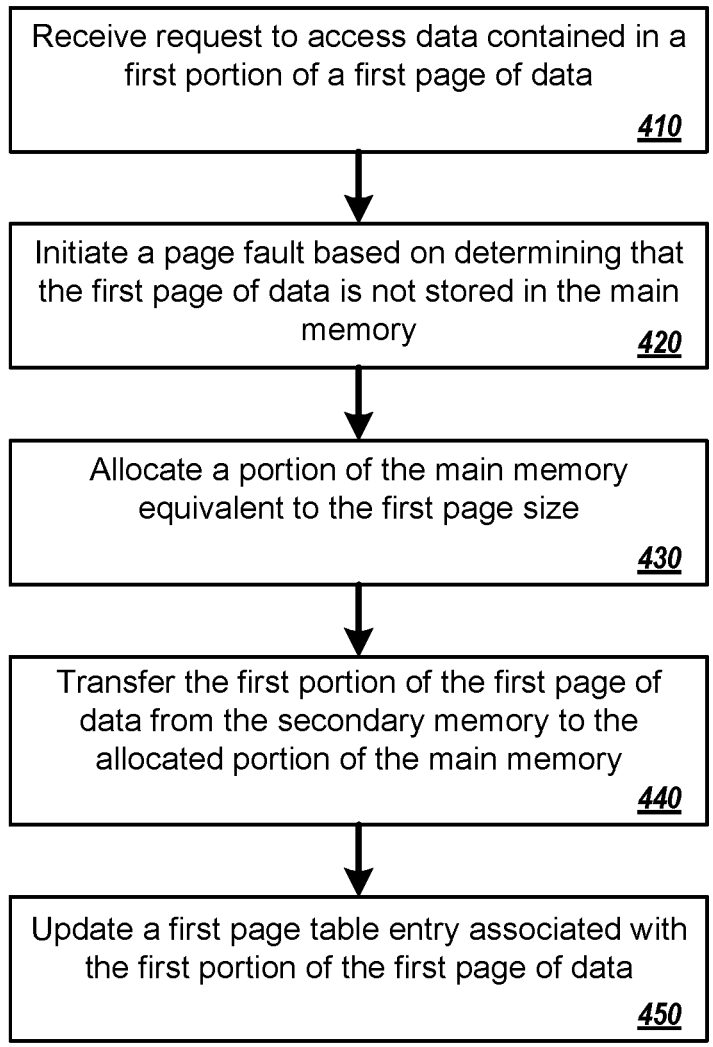
FIG. 4 depicts a flowchart of an example of a process for memory management, according to implementations of the present disclosure.

FIG. 4 depicts a flowchart of an example of a process 400 for memory management, according to implementations of the present disclosure. The process 400 may include, at 410, receiving a request to access, from a main memory, data contained in a first portion of a first page of data. The first page of data may have a first page size, e.g., a huge page, and the first portion may have a second page size, e.g., a small page, that is less than the first page size. At 420, a page fault may be initiated based on determining that the first page of data is not stored in the main memory and is stored in a secondary memory. Further, in response to initiating the page fault, a portion of the main memory equivalent to the first page size, e.g., a huge page, may be allocated at 430. The first portion of the first page of data may be transferred, at 440, from the secondary memory to the allocated portion of the main memory without transferring the entire first page of data. Thus, a remaining amount of the first page of data may remain stored in the secondary memory. At 450, a first page table entry associated with the first portion of the first page of data may be updated to point to a location of the allocated portion of the main memory to which the first portion of the first page of data is transferred. Subsequently, the remaining amount of the first page of data may be transferred from the secondary memory to the main memory, for example, in the background while the application continues running.

To transfer the remaining amount of the first page of data, respective portions, corresponding to the second page size, of the first page of data may be transferred from the secondary memory to the allocated portion of the main memory until the entire first page of data is stored in the main memory. Further, a respective page table entry for each of the respective portions of the first page of data may be updated to point to respective locations of the respective portions of the first page of data in the main memory. Moreover, once the entire first page of data is stored in the main memory, the first page of data may be coalesced or reassembled from the respective portions of the first page of data transferred from the secondary memory to the allocated portion of the main memory. In accordance with the reassembling, a page table entry associated with the first page of data may be updated to point to a location of the reassembled first page of data in the main memory.

In certain implementations, before transferring the remaining portion of the first page of data from the secondary memory to the main memory, the system may indicate that the first portion of the first page of data that was requested to be accessed has been transferred to the main memory, so that the application or thread that requested access may continue running by accessing the requested data in main memory.

An example of a process for memory management may also include determining whether an access bit is set for each page table entry of a page table based on a scan of the page table with a page table scanner. In such a process, the access bit may indicate whether a page associated with the page table entry was accessed in a last scan period. As described above, at least one of the pages having the first page size, e.g., a huge page, may be divided into pages of the second page size, e.g., small pages, with a page table entry for each of the pages of the second page size in the page table being scanned. In certain implementations, a count for each page may be incremented in response to determining that the access bit is not set for the page table entry associated with the page. Subsequently, the access bit may be reset, after determining whether the access bit is set for each page table entry.

In certain implementations, if the portion of the main memory equivalent to the first page size cannot be allocated, one of a least used pages having the first page size may be determined based on the count for each page and the determined least used page may be released into the secondary memory. Accordingly, a portion of the main memory equivalent to the first page size may be allocated at the location of the released one of the least used pages. Conversely, if the portion of the main memory equivalent to the first page size can be allocated, the first portion of the first page of data may be transferred from the secondary memory to the allocated portion of the main memory.

In more detail, for example, if the main memory does not have a free page and cannot receive the page transfer, one of the least used pages in main memory may be determined based on the count for each page. A page fault handler or controller may manage the page transfer and the determined one of the least used pages may be released or written back into the secondary memory. Further, the page of data for which access is requested may be transferred from the secondary memory to the main memory at the location of the released one of the least used pages. Alternatively, if the main memory does have a free page and can receive the page transfer, the page fault handler or controller may manage transferring of the page data from the secondary memory to the main memory.

In certain embodiments, when the page fault is initiated, execution of the thread or running program may be stalled while the data transfer is managed to service the page fault, as described above. Subsequently, the thread may be released to access the page in the main memory after the page fault is serviced.

In certain implementations, it may be advantageous to determine not only which pages in the secondary memory are getting "hot", i.e., an increase in frequency of access, but also to determine which pages in main memory DRAM are getting "cold", i.e., a decrease in frequently of access. In other words, determining which pages are accessed more frequently in the secondary memory, which may be slower than the main memory, and which pages are accessed less frequently in the main memory. One process to determine which pages are accessed less frequently in the main memory is described above with reference to usage or access statistics for the main memory, e.g., DRAM, based on, for example, a count of the access bit being set. The system may determine when to move data from main memory to secondary memory and when to move data from secondary memory to main memory based on the access statistics described above for the main memory.

In addition, as described in more detail above, pages that are cooling off or being accessed less frequently may be determined by monitoring the PTEs. For example, when the inter-access time for a page satisfies an inter-access time threshold, the system may initiate transfer of the page from main memory to the secondary memory by invalidating the PTE associated with the page, executing a TLB shootdown for any entries associated with the page, and transferring the page from main memory into the secondary memory.

According to certain implementations, with a cache coherent interconnect, the DRAM cache and the second tier of memory may be managed by hardware, which may act both as an owner of coherent memory and a user of coherent memory. In other words DRAM acts as a cache, managed by the hardware, for paging at a configurable granularity for optimal performance. The configurable granularity for optimal performance may depend on application locality and the performance of the second tier of memory.

The customized kernel driver, as described above, may map the address space owned by the hardware with huge pages only. In this manner, the system may achieve the benefits of huge pages, such as improved performance due to larger TLB reach, whenever the system accesses this region of memory. The hardware may maintain a cache lookup structure to check if a page is present in main memory. When a memory access is received from the host, this lookup structure may be queried. If the page is present, the read or write may be performed directly in main memory. If the page is absent, the data may be fetched from the secondary memory into main memory, e.g., DRAM. In certain implementations, for performance considerations, the cache may perform evictions asynchronously—e.g., "cold" data may be written back to secondary storage in the background to keep a minimum number of pages free to service incoming pages. In general, this process may provide a caching mechanism at the page level, such that a cache for paging may be provided with a cache coherent interconnect.

In certain implementations cache optimizations may be applied. For example, when a page fault occurs and a page is transferred from secondary storage to main memory, the system may determine whether to keep the page in main memory, or if the page is non-temporal, to stream the page and read it once for the given access, or perform pre-fetching by determining to fetch the next page in response to the currently fetched page being accessed. In certain implementations, flags may be set regarding how an application is using memory, and the determination for pre-fetching may be made based on those flags.

A number of implementations have been described. Nevertheless, it will be understood that various modifications may be made without departing from the spirit and scope of the disclosure. For example, various forms of the flows shown above may be used, with steps re-ordered, added, or removed.

Implementations of the invention and all of the functional operations described in this specification can be implemented in digital electronic circuitry, firmware, or hardware, including the structures disclosed in this specification and their structural equivalents, or in combinations of one or more of them. Implementations of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this disclosure contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed.

Accordingly, other implementations are within the scope of the following claims.

What is claimed is:

1. A computer-implemented method comprising:
receiving a request to access, from a main memory, data contained in a first portion of a first page of data, the first page of data having a first page size and the first portion comprising a second page size that is less than the first page size;
initiating a page fault based on determining that the first page of data is not stored in the main memory and is stored in a secondary memory;
in response to initiating the page fault, allocating a portion of the main memory equivalent to the first page size;
transferring the first portion of the first page of data from the secondary memory to the allocated portion of the main memory without transferring the entire first page of data, wherein a remaining amount of the first page of data remains stored in the secondary memory;
updating a first page table entry associated with the first portion of the first page of data to point to a location of the allocated portion of the main memory to which the first portion of the first page of data is transferred; and
transferring the remaining amount of the first page of data from the secondary memory to the main memory, including:
repeatedly transferring respective portions, corresponding to the second page size, of the first page of data from the secondary memory to the allocated portion of the main memory until the entire first page of data is stored in the main memory; and updating a respective page table entry for each of the respective portions of the first page of data to point to respective locations of the respective portions of the first page of data in the main memory.

2. The method of claim 1, further comprising:

once the entire first page of data is stored in the main memory, reassembling the first page of data from the respective portions of the first page of data transferred from the secondary memory to the allocated portion of the main memory; and updating a page table entry associated with the first page of data to point to a location of the reassembled first page of data in the main memory.

3. The method of claim 1, further comprising:

before transferring the remaining portion of the first page of data from the secondary memory to the main memory, indicating that the first portion of the first page of data that was requested to be accessed has been transferred to the main memory.

4. The method of claim 1, further comprising:

changing a memory structure of the first page of data having the first page size into a plurality of pages of data having the second page size that is less than the first page size.

5. A computer-implemented method, comprising:

receiving a request to access, from a main memory, data contained in a first portion of a first page of data, the first page of data having a first page size and the first portion comprising a second page size that is less than the first page size;

initiating a page fault based on determining that the first page of data is not stored in the main memory and is stored in a secondary memory;

in response to initiating the page fault, allocating a portion of the main memory equivalent to the first page size;

transferring the first portion of the first page of data from the secondary memory to the allocated portion of the main memory without transferring the entire first page of data, wherein a remaining amount of the first page of data remains stored in the secondary memory;

updating a first page table entry associated with the first portion of the first page of data to point to a location of the allocated portion of the main memory to which the first portion of the first page of data is transferred;

determining whether an access bit is set for each page table entry of a page table based on a scan of the page table with a page table scanner, the access bit indicating whether a page associated with the page table entry was accessed in a last scan period, wherein at least one of the pages having the first page size is divided into pages of the second page size with a page table entry for each of the pages of the second page size in the page table being scanned;

incrementing a count for each page in response to determining that the access bit is not set for the page table entry associated with the page;

after determining whether the access bit is set for each page table entry, resetting the access bit; and reassembling the pages of the second page size into the page having the first page size that was divided.

6. The method of claim 5, further comprising:

if the portion of the main memory equivalent to the first page size cannot be allocated, determining one of a least used pages having the first page size based on the count for each page and releasing the one of the least used pages into the secondary memory, and allocating a portion of the main memory equivalent to the first page size at the location of the released one of the least used pages; and if the portion of the main memory equivalent to the first page size can be allocated, transferring the first portion of the first page of data from the secondary memory to the allocated portion of the main memory.

7. A system comprising:

one or more processors; and a memory comprising a main memory and a secondary memory, the memory storing instructions that are operable, when executed, to cause the one or more processors to perform operations comprising:

receiving a request to access, from a main memory, data contained in a first portion of a first page of data, the first page of data having a first page size and the first portion comprising a second page size that is less than the first page size;

initiating a page fault based on determining that the first page of data is not stored in the main memory and is stored in a secondary memory;

in response to initiating the page fault, allocating a portion of the main memory equivalent to the first page size;

transferring the first portion of the first page of data from the secondary memory to the allocated portion of the main memory without transferring the entire first page of data, wherein a remaining amount of the first page of data remains stored in the secondary memory;

updating a first page table entry associated with the first portion of the first page of data to point to a location of the allocated portion of the main memory to which the first portion of the first page of data is transferred; and transferring the remaining amount of the first page of data from the secondary memory to the main memory, including:

repeatedly transferring respective portions, corresponding to the second page size, of the first page of data from the secondary memory to the allocated portion of the main memory until the entire first page of data is stored in the main memory; and updating a respective page table entry for each of the respective portions of the first page of data to point to respective locations of the respective portions of the first page of data in the main memory.

8. The system of claim 7, the operations further comprising:

once the entire first page of data is stored in the main memory, reassembling the first page of data from the respective portions of the first page of data transferred from the secondary memory to the allocated portion of the main memory; and updating a page table entry associated with the first page of data to point to a location of the reassembled first page of data in the main memory.

9. The system of claim 7, the operations further comprising:

before transferring the remaining portion of the first page of data from the secondary memory to the main memory, indicating that the first portion of the first page of data that was requested to be accessed has been transferred to the main memory.

10. The system of claim 7, the operations further comprising:

changing a memory structure of the first page of data having the first page size into a plurality of pages of data having the second page size that is less than the first page size.

11. A system comprising:
one or more processors; and
a memory comprising a main memory and a secondary memory, the memory storing instructions that are operable, when executed, to cause the one or more processors to perform operations comprising:
receiving a request to access, from a main memory, data contained in a first portion of a first page of data, the first page of data having a first page size and the first portion comprising a second page size that is less than the first page size;
initiating a page fault based on determining that the first page of data is not stored in the main memory and is stored in a secondary memory;
in response to initiating the page fault, allocating a portion of the main memory equivalent to the first page size;
transferring the first portion of the first page of data from the secondary memory to the allocated portion of the main memory without transferring the entire first page of data, wherein a remaining amount of the first page of data remains stored in the secondary memory;
updating a first page table entry associated with the first portion of the first page of data to point to a location of the allocated portion of the main memory to which the first portion of the first page of data is transferred;
determining whether an access bit is set for each page table entry of a page table based on a scan of the page table with a page table scanner, the access bit indicating whether a page associated with the page table entry was accessed in a last scan period, wherein at least one of the pages having the first page size is divided into pages of the second page size with a page table entry for each of the pages of the second page size in the page table being scanned;
incrementing a count for each page in response to determining that the access bit is not set for the page table entry associated with the page;
after determining whether the access bit is set for each page table entry, resetting the access bit; and
reassembling the pages of the second page size into the page having the first page size that was divided.

12. The system of claim 11, the operations further comprising:
if the portion of the main memory equivalent to the first page size cannot be allocated, determining one of a least used pages having the first page size based on the count for each page and releasing the one of the least used pages into the secondary memory, and allocating a portion of the main memory equivalent to the first page size at the location of the released one of the least used pages; and
if the portion of the main memory equivalent to the first page size can be allocated, transferring the first portion of the first page of data from the secondary memory to the allocated portion of the main memory.

13. A non-transitory computer-readable storage device storing instructions executable by one or more processors which, upon such execution, cause the one or more processors to perform operations comprising:
receiving a request to access, from a main memory, data contained in a first portion of a first page of data, the first page of data having a first page size and the first portion comprising a second page size that is less than the first page size;
initiating a page fault based on determining that the first page of data is not stored in the main memory and is stored in a secondary memory;
in response to initiating the page fault, allocating a portion of the main memory equivalent to the first page size;
transferring the first portion of the first page of data from the secondary memory to the allocated portion of the main memory without transferring the entire first page of data, wherein a remaining amount of the first page of data remains stored in the secondary memory;
updating a first page table entry associated with the first portion of the first page of data to point to a location of the allocated portion of the main memory to which the first portion of the first page of data is transferred; and
transferring the remaining amount of the first page of data from the secondary memory to the main memory, including:
repeatedly transferring respective portions, corresponding to the second page size, of the first page of data from the secondary memory to the allocated portion of the main memory until the entire first page of data is stored in the main memory; and
updating a respective page table entry for each of the respective portions of the first page of data to point to respective locations of the respective portions of the first page of data in the main memory.

14. The storage device of claim 13, comprising:
once the entire first page of data is stored in the main memory, reassembling the first page of data from the respective portions of the first page of data transferred from the secondary memory to the allocated portion of the main memory; and
updating a page table entry associated with the first page of data to point to a location of the reassembled first page of data in the main memory.

15. A non-transitory computer-readable storage device storing instructions executable by one or more processors which, upon such execution, cause the one or more processors to perform operations comprising:
receiving a request to access, from a main memory, data contained in a first portion of a first page of data, the first page of data having a first page size and the first portion comprising a second page size that is less than the first page size;
initiating a page fault based on determining that the first page of data is not stored in the main memory and is stored in a secondary memory;
in response to initiating the page fault, allocating a portion of the main memory equivalent to the first page size;
transferring the first portion of the first page of data from the secondary memory to the allocated portion of the main memory without transferring the entire first page of data, wherein a remaining amount of the first page of data remains stored in the secondary memory;
updating a first page table entry associated with the first portion of the first page of data to point to a location of the allocated portion of the main memory to which the first portion of the first page of data is transferred;
determining whether an access bit is set for each page table entry of a page table based on a scan of the page table with a page table scanner, the access bit indicating whether a page associated with the page table entry was accessed in a last scan period, wherein at least one of the pages having the first page size is divided into pages of the second page size with a page table entry for each of the pages of the second page size in the page table being scanned;

incrementing a count for each page in response to determining that the access bit is not set for the page table entry associated with the page;

after determining whether the access bit is set for each page table entry, resetting the access bit;

reassembling the pages of the second page size into the page having the first page size that was divided;

if the portion of the main memory equivalent to the first page size cannot be allocated, determining one of a least used pages having the first page size based on the count for each page and releasing the one of the least used pages into the secondary memory, and allocating a portion of the main memory equivalent to the first page size at the location of the released one of the least used pages; and if the portion of the main memory equivalent to the first page size can be allocated, transferring the first portion of the first page of data from the secondary memory to the allocated portion of the main memory.

\* \* \* \* \*